(12) United States Patent
Kim et al.

(10) Patent No.: US 7,613,095 B2
(45) Date of Patent: Nov. 3, 2009

(54) OPTICAL PICKUP APPARATUS

(75) Inventors: Bong-Gi Kim, Suwon-si (KR); Soo-Han Park, Yongin-si (KR); Young-Man Ahn, Suwon-si (KR); Jang-Hoon Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 663 days.

(21) Appl. No.: 11/290,457

(22) Filed: Dec. 1, 2005

(65) Prior Publication Data

US 2007/0025229 A1    Feb. 1, 2007

(30) Foreign Application Priority Data

Jan. 20, 2005   (KR) .................... 10-2005-0005472

(51) Int. Cl.
*G11B 7/00* (2006.01)
(52) U.S. Cl. .................... 369/112.01; 369/112.23; 369/44.37
(58) Field of Classification Search .................... None
See application file for complete search history.

(56) References Cited

U.S. PATENT DOCUMENTS

| | | |
|---|---|---|
| 2003/0095334 A1 | 5/2003 | Kim et al. |
| 2003/0185133 A1 | 10/2003 | Kaiho et al. |
| 2004/0120229 A1 | 6/2004 | Pae et al. |
| 2004/0170106 A1 | 9/2004 | Komma |
| 2005/0030878 A1* | 2/2005 | Park et al. ............... 369/112.08 |
| 2005/0226122 A1 | 10/2005 | Ooi et al. |

FOREIGN PATENT DOCUMENTS

| | | |
|---|---|---|
| EP | 1 096 483 | 5/2001 |
| EP | 1 130 581 | 9/2001 |
| EP | 1 617 424 | 1/2006 |
| JP | 2000-353332 A | 12/2000 |
| JP | 1020010039383 | 5/2001 |
| JP | 1020010073413 | 8/2001 |
| JP | 2003-173563 | 6/2003 |
| JP | 2004-087072 | 3/2004 |
| JP | 2004-111012 | 4/2004 |
| JP | 2004-152446 | 5/2004 |
| JP | 2004-281008 | 10/2004 |
| WO | WO2004-095444 A1 | 11/2004 |

* cited by examiner

*Primary Examiner*—Muhammad N. Edun
(74) *Attorney, Agent, or Firm*—Roylance, Abrams, Berdo & Goodman, L.L.P.

(57) ABSTRACT

An optical pickup apparatus according to an embodiment of the present invention, comprises an optical unit for projecting a plurality of wavelengths of light, the light including a celadon light, toward a recording medium and receiving the light reflected from the recording medium to thereby detect an information signal and an error signal, and a compatible objective lens for focusing a light projected from the optical unit to thereby form an optical spot on a recording surface of the recording medium and applying at least three light having different wavelength ranges to be compatibly used for both the high-density and the low-density recording mediums. Accordingly, the optical pickup apparatus is capable of compatibly employing a high-density recording medium, which uses a celadon light and is slimmer than a digital versatile disc (DVD), and at least one low-density recording medium.

17 Claims, 1 Drawing Sheet

OPTICAL PICKUP APPARATUS

CROSS-REFERENCE TO RELATED APPLICATIONS

Figure 1:
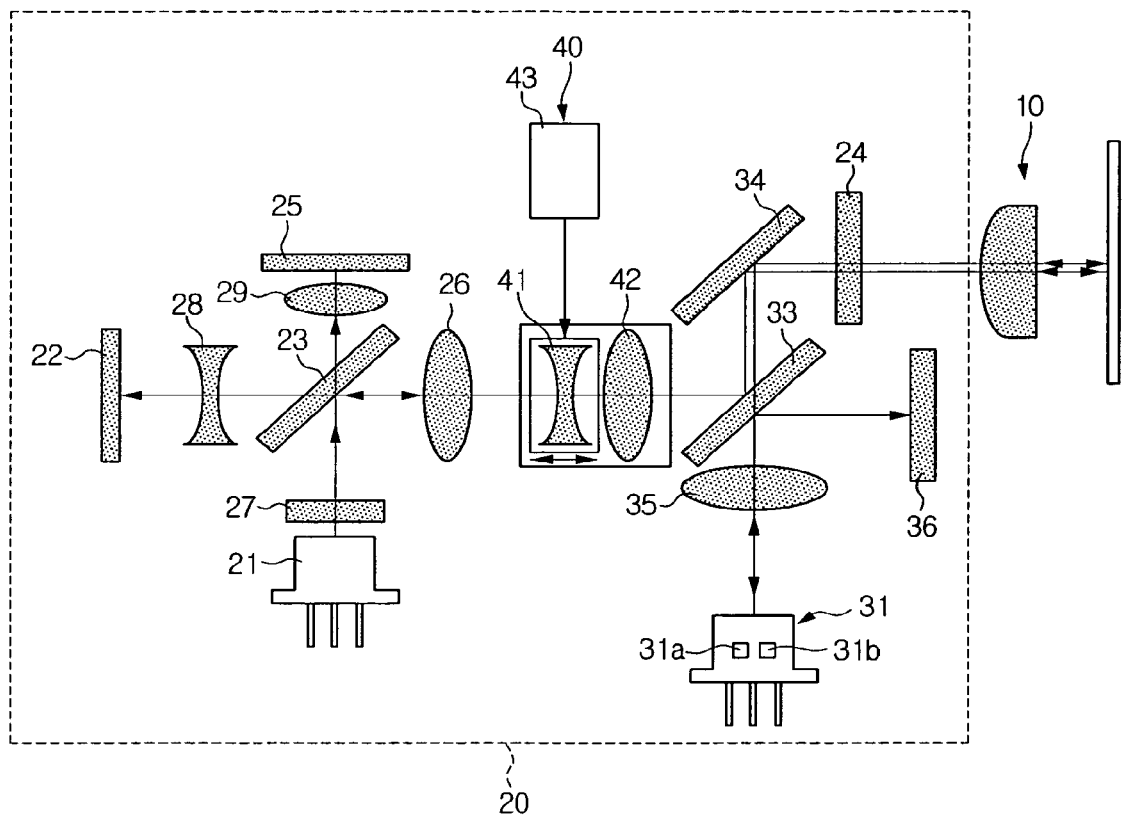

This application claims the benefit under 35 U.S.C. § 119 (a) of Korean Patent Application No. 2005-5472, filed Jan. 20, 2005, the entire contents of which are incorporated herein by reference.

BACKGROUND OF THE INVENTION

1. Field of the Invention

The present invention relates to a compatible optical pickup apparatus. More particularly, the present invention relates to an optical pickup apparatus having a simple optical system and is capable of compatibly employing a plurality of optical recording mediums having different recording densities.

2. Description of the Related Art

In an optical recording/reproducing apparatus which records and reproduces information on and from a storage medium such as an optical disc using a light focused by an objective lens, recording capacity is determined by a size of an optical spot on the storage medium. The size of the optical spot is determined by a wavelength ($\lambda$) of the light being used and a numerical aperture (NA) of the objective lens, as expressed in Equation 1 below.

$$S \propto \lambda/NA \qquad \text{Equation 1}$$

Therefore, in order to reduce the size of the optical spot formed on the optical disc and provide greater storage density on the optical disc, a short-wavelength light source such as a celadon laser and an objective lens having an NA of at least 0.6 should be employed.

A digital versatile disc (DVD) uses a light having a wavelength of 650 nm (or 635 nm) and an objective lens having a NA of 0.6 or, 0.65 when a DVD-recordable (R) is used to record and reproduce the information. Capacity of a DVD, having a diameter of 120 mm and a track pitch of 0.74 μm, is roughly 4.7 GB per side.

Also, a Blue-ray disc (BD) has been developed as an advanced high-density optical recording medium which uses an objective lens having a large NA, such as, 0.85.

When using the BD, a blue light source having short wavelength (405 to 408 nm) may be used. A thickness of the disc may be 0.1 mm. Such a BD can have nearly 10 times as much storage capacity as the DVD. However, compatibility with conventional storage mediums or playback devices is important when developing new optical recording medium.

For example, since the DVD-R and a compact disc (CD)-R, which are conventional once-writable optical discs, have poor reflexibility, light sources which project light having wavelengths of 650 nm and 780 nm should be employed. In consideration of compatibility between the DVD-R and the CD-R, an optical pickup for the BD needs to employ three light sources having different wavelengths and a plurality of objective lenses having different NAs.

However, fabrication of such an optical pickup, which is compatible with CDs, DVDs and BDs, requires a lot of component parts, and this complicates the structure of the optical pickup.

Accordingly, there is a need for an optical pickup apparatus having a simple optical system that is compatible with different optical mediums having different recording densities.

SUMMARY OF THE INVENTION

An aspect of the present invention is to solve at least the above problems and/or disadvantages and to provide at least the advantages described below. Accordingly, an aspect of the present invention is to provide an optical pickup apparatus having a simple optical system that is compatible with a plurality of optical recording mediums having different recording densities.

In order to achieve the above-described aspects of the present invention, there is provided an optical pickup apparatus capable of compatibly employing a high-density recording medium, which uses a celadon light and is slimmer than a digital versatile disc (DVD), and at least one low-density recording medium. The optical pickup apparatus comprises an optical unit for projecting a plurality of wavelengths of light, the lights comprising at least the celadon light, toward a recording medium and receiving light reflected from the recording medium to thereby detect an information signal and an error signal, and a compatible objective lens for focusing light projected from the optical unit to thereby form an optical spot on a recording surface of the recording medium and applying at least three wavelength ranges of light to be compatibly used for both the high-density and the low-density recording mediums.

The low-density recording medium comprises a DVD or a compact disc (CD), and the optical unit comprises a first light source for projecting the celadon light for the high-density recording medium, a 2-wavelength light source module for projecting an infrared light onto the CD and a red light onto the DVD and receiving the light being reflected to thereby detect a signal, a first light detector for receiving the light projected by the first light source and reflected from the recording medium to thereby detect a signal, a first optical path converter for changing a path of the light projected by the first light source, and a second optical path converter for changing a path of the light projected by the 2-wavelength light source module.

The optical unit further comprises a first monitoring light detector which receives a part of the light projected by the first light source to monitor an output of the first light source.

The optical unit further comprises a second monitoring light detector which receives the lights of different wavelengths, projected by the 2-wavelength light source module to monitor an output of the 2-wavelength light source module.

The second monitoring light detector and the 2-wavelength light source module are mounted so that optical axes of the lights being projected and incident with respect to the second monitoring light detector and the 2-wavelength light form substantially 90°.

The first optical path converter comprises a polarization beam splitter for reflecting or transmitting an incident light according to polarization components of the incident light, and a wavelength plate for changing the polarization component of the light projected by the first light source and reflected from the recording medium.

The second optical path converter comprises a non-polarization beam splitter between the wavelength plate and the polarization beam splitter.

Preferably, a reflection member is disposed between the non-polarization beam splitter and the wavelength plate.

The second optical path converter is disposed in a path of the light projected by the first light source.

The second optical path converter comprises the non-polarization beam splitter which reflects or transmits the incident light according to the wavelength of the incident light.

The non-polarization beam splitter predominately transmits the light having a wavelength equal to or greater than 650 nm and reflects the light having a wavelength less than 650 nm.

The first optical path converter comprises the polarization beam splitter for reflecting or transmitting the incident light according to a polarization component of the incident light, and the wavelength plate for changing the polarization component of the light projected by the first light source and reflected from the recording medium.

The second optical path converter further comprises at least one reflection member.

The optical unit further comprises a spherical aberration compensation unit for compensating for spherical aberrations that occur when using the high-density recording medium using the celadon light.

The spherical aberration compensation unit comprises a zoom lens mounted to zoom in a direction of the optical axis of the celadon light, and a driving unit for operating the zoom lens.

The first light source and the 2-wavelength light source module are arranged adjacent to each other to project parallel lights.

The first light detector and the first light source are arranged so that the optical axis of the light incident to the first light detector is substantially perpendicular to that of the light projected from the first light source.

The high-density recording medium comprises an optical disc comprising a Blue-ray disc (BD).

The first light source comprises a laser diode for projecting the celadon light.

The first monitoring light detector directs the first light source.

BRIEF DESCRIPTION OF THE DRAWING FIGURES

The above aspect and other features of the present invention will become more apparent by describing in detail exemplary embodiments thereof with reference to the attached drawing FIGURE, wherein;

FIG. 1 schematically illustrates an exemplary optical pickup apparatus according to an embodiment of the present invention.

Throughout the drawings, the same or similar elements, features and structures are represented by the same reference numerals.

DETAILED DESCRIPTION OF EXEMPLARY EMBODIMENTS

Hereinafter, an embodiment of the present invention will be described in detail with reference to the accompanying drawing figures.

In the following description, the matters defined in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Also, well-known functions or constructions are omitted for clarity and conciseness.

Referring to FIG. 1, an exemplary optical pickup apparatus according to an embodiment of the present invention is capable of compatibly employing a plurality of optical recording mediums which have different thicknesses and different recording densities. The optical pickup apparatus comprises an exemplary 3-wavelength compatible objective lens 10 used to record and reproduce information on a plurality of recording mediums having different recording densities, the recording mediums comprising at least one low-density medium and a high-density medium using a celadon light, and an optical unit 20 for projecting a plurality of lights having different wavelengths toward the recording mediums and receiving the lights reflected by the recording mediums, thereby detecting an information reproducing signal and an error signal.

The low-density recording medium preferably comprises an optical disc belonging to a compact disc system (CD) which uses an infrared light of approximately 780 nm wavelength and an optical disc belonging to a digital versatile disc system (DVD) which uses a red light of approximately 650 nm wavelength. The CD has an exemplary thickness of approximately 1.2 mm while the DVD has an exemplary thickness of approximately 0.6 mm.

The high-density recording medium preferably comprises an optical disc belonging to a Blue-ray disc system (BD) which uses a celadon light of approximately 405 nm wavelength. The BD has an exemplary thickness of approximately 0.1 mm. Thus, the BD is slimmer than the CD and the DVD.

The 3-wavelength compatible objective lens 10 has 3-wavelength compatibility capable of being compatibly applied to the recording mediums having three different recording densities and using lights of different wavelength ranges. Since the 3-wavelength compatible objective lens 10 is well-known in the art, a detailed description thereof will be omitted. The 3-wavelength compatible objective lens 10 is driven by an actuator (not shown) in focusing and tracking directions.

The optical unit 20 comprises a first light source 21 for projecting the celadon light for the BD, a 2-wavelength light source module 31 for projecting the infrared light and the red light respectively for the CD and the DVD and receiving the lights as reflected, a first light detector 22 for receiving the light projected by the first light source 21 and reflected from the recording medium, first optical path converters 23 and 24 for changing a path of the light projected by the first light source 21, and second optical path converters 33 and 34 for changing a path of the light projected by the 2-wavelength light source module 31.

The first light source 21 is preferably implemented by a laser diode which projects a celadon light having an exemplary wavelength of approximately 405 nm.

The 2-wavelength light source module 31 comprises therein a second light source 31a for projecting a red light having an exemplary wavelength of approximately 650 nm and a third light source 31b for projecting an infrared light having an exemplary wavelength range of approximately 780 nm. The second light source 31a comprises a red laser diode and the third light source 31b comprises an infrared laser diode. Thus, the 2-wavelength light source module 31 comprises the red laser diode 31a and the infrared laser diode 31b arranged adjacent to each other and modularized and therefore, is usually called a 'Twin LD'. Additionally, the 2-wavelength light source module 31 comprises an optical path converter (not shown) and a second light detector (not shown) which detects an information signal and an error signal from the light reflected from the recording medium. Since the 2-wavelength light source module 31 is generally known in the art, a detailed description thereof will be omitted.

The first light source 21 and the 2-wavelength light source module 31 are arranged adjacent to each other and more preferably, they are arranged so that optical axes of the lights therefrom are parallel.

The first light detector 22 receives the light projected by the first light source 21 and reflected from the BD and thereby detects the information signal and the error signal. The first light detector 22 is disposed adjacent to the first light source 21 so that an optical axis of the incident light is substantially perpendicular to that of the light projected from the first light source 21.

The first optical path converters 23 and 24 may comprise a polarization beam splitter 23 which reflects or transmits the incident light according to a polarization component of the incident light and a wavelength plate 24 which changes the polarization component of the light reflected from the BD. The polarization beam splitter 23 may be a plate-type polarization beam splitter, for example, which reflects the light projected by the first light source 21 toward the objective lens 10 and transmits the light reflected from the recording medium so that the reflected light can be directed to the first light detector 22. The wavelength plate 24 is disposed between the polarization beam splitter 23 and the objective lens 10 to change polarization component of the reflected light, being applied with a predetermined voltage.

A first monitoring light detector 25 is disposed to direct the first light source 21, and the polarized beam splitter 23 is disposed between the first monitoring light detector 25 and the first light source 21. The first monitoring light detector 25 receives a part of the light projected by the first light source 21 and transmitted through the polarization beam splitter 23 so as to monitor an output of the first light source 21.

On the optical path between the polarization beam splitter 23 and the objective lens 10, a first collimating lens 26 is disposed to change the light projected from the first light source 21 to a parallel light. A grating element 27 is disposed between the first light source 21 and the polarization beam splitter 23, a sensor lens 28 between the polarization beam splitter 23 and the first light detector 22, and a second collimating lens 29 between the polarization beam splitter 23 and the first monitoring light detector 25.

The second optical path converters 33 and 34 are disposed in a path of the light projected from the first light source 21. Preferably, the second optical path converters 33 and 34 are disposed between the polarization beam splitter 23 and the wavelength plate 24. Accordingly, the second optical path converters 33 and 34 guide the light projected from the first light source 21 toward the objective lens 10 and the light reflected from the recording medium toward the polarization beam splitter 23. Therefore, the number of parts of the optical system can be reduced, also simplifying the structure of the optical system.

The second optical path converters 33 and 34 may comprise a non-polarization beam splitter 33 and a reflection member 34. The non-polarization beam splitter 33 reflects or transmits the incident light according to a wavelength range of the incident light, regardless of the polarization component. Therefore, the non-polarization beam splitter 33 preferably has wavelength-dependence, that is, reflecting the light projected from the first light source 21 but transmitting most of the light projected from the 2-wavelength light source module 31. More specifically, the non-polarization beam splitter 33 transmits the red light and the infrared light having the wavelength range equal to or greater than 650 nm and reflects the celadon light having the wavelength range of approximately 405 nm.

The reflection member 34 reflects the incident light toward the objective lens 10 or the non-polarization beam splitter 33 according to the incidence of the light, thereby converting the optical path by substantially 90°. The optical unit 20 may be structured without the reflection member 34; however, it is preferable to provide the reflection member 34 between the non-polarization beam splitter 33 and the wavelength plate 24 for compactness and high integration of the optical system.

A third collimating lens 35 is disposed between the non-polarization beam splitter 33 and the 2-wavelength light source module 31.

When the CD and the DVD are for recording and reproduction, a second monitoring light detector 36 may be further provided to monitor power of the light projected from the 2-wavelength light source module 31. The second monitoring light detector 36 is preferably disposed adjacent to the 2-wavelength light source module 31 in a manner that the optical axis of the light projected from the 2-wavelength light source module 31 is substantially perpendicular to that of the light incident to the second monitoring light detector 36. The 2-wavelength light source module 31 is a 2-wavelength compatible light detector capable of compatibly receiving the red light having the wavelength range of approximately 650 nm and the infrared light having the wavelength range of approximately 780 nm.

Furthermore, a spherical aberration compensation unit 40 is provided to compensate for spherical aberrations occurring due to the thickness of the BD when using the first light source 21. The spherical aberration compensation unit 40 comprises a zoom lens 41, a collimating lens for compensation 42 and a driving unit 43.

The zoom lens 41 reciprocates by a predetermined distance on the path of the light projected form the first light source 21, thereby compensating for spherical aberrations when using the BD which is relatively thin. The collimating lens for compensation 42 is disposed adjacent to the zoom lens 41 to adjust the incident light to the parallel light.

The driving unit 43 may comprise a stepping motor, for example, to drive the zoom lens 41 by a predetermined distance.

Although the plate-type beam splitters are used for the beam splitters 23 and 33 in the optical pickup apparatus according to an embodiment of the present invention, this is merely by way of an example, and therefore, the present invention is not limited to this embodiment. For example, a cubic-type beam splitter may be employed.

As can be appreciated from the above description, the structure of the optical system can be simplified by applying the optical pickup apparatus according to an embodiment of the present invention, which employs an exemplary 3-wavelength objective lens and the 2-wavelength light source module compatibly using the DVD and the CD.

The simplified structure of the optical system can reduce the size of the pickup and the manufacturing cost.

Also, the optical path and the number of parts are accordingly reduced, thereby improving reliability of the products.

While the invention has been shown and described with reference to certain embodiments thereof, it will be understood by those skilled in the art that various changes in form and details may be made therein without departing from the spirit and scope of the invention as defined by the appended claims.

What is claimed is:

1. An optical pickup apparatus capable of compatibly employing a high-density recording medium, which uses a celadon light and is slimmer than a digital versatile disc (DVD), and at least one low-density recording medium, the optical pickup apparatus comprising:

an optical unit for projecting a plurality of lights of different wavelengths, the lights including a celadon light, toward a recording medium and receiving the lights reflected from the recording medium to thereby detect an information signal and an error signal; and a compatible objective lens for focusing a light projected from the optical unit to thereby form an optical spot on a recording surface of the recording medium and applicable for at least three lights having different wavelength ranges to be compatibly used for both the high-density and the low-density recording mediums;

wherein the low-density recording medium comprises the DVD and a compact disc (CD); and wherein the optical unit comprises:

a first light source for projecting the celadon light for the high-density recording medium;

a 2-wavelength light source module for projecting an infrared light for the CD and the red light for the DVD and receiving the lights being reflected to thereby detect a signal;

a first light detector for receiving the light projected by the first light source and reflected from the recording medium to thereby detect a signal;

a first optical path converter for changing a path of the light projected by the first light source;

a second optical path converter for changing a path of the light projected by the 2-wavelength light source module; and a first monitoring light detector which receives the lights of different wavelengths, projected by the 2-wavelength light source module to monitor output of the 2-wavelength light source module;

wherein the first monitoring light detector and the 2-wavelength light source module are mounted so that optical axes of the lights being projected and incident with respect to the first monitoring light detector and the 2-wavelength light source module form substantially 90°.

2. The optical pickup apparatus of claim 1, wherein the optical unit further comprises:

a second monitoring light detector which receives a part of the light projected by the first light source to monitor output of the first light source.

3. The optical pickup apparatus of claim 1, wherein the first optical path converter comprises:

a polarization beam splitter reflecting or transmitting an incident light according to polarization component of the incident light; and a wavelength plate changing the polarization component of the light projected by the first light source and reflected from the recording medium.

4. The optical pickup apparatus of claim 1, wherein the second optical path converter is disposed on a path of the light projected by the first light source.

5. The optical pickup apparatus of claim 4, wherein the second optical path converter comprises the non-polarization beam splitter which reflects or transmits the incident light according to the wavelength of the incident light.

6. The optical pickup apparatus of claim 5, wherein the first optical path converter comprises:

the polarization beam splitter reflecting or transmitting the incident light according to polarization component of the incident light; and the wavelength plate changing the polarization component of the light projected by the first light source and reflected from the recording medium.

7. The optical pickup apparatus of claim 5, wherein the second optical path converter further comprises at least one reflection member.

8. The optical pickup apparatus of claim 1, wherein the optical unit further comprises a spherical aberration compensation unit for compensating spherical aberration occurring when using the high-density recording medium using the celadon light.

9. The optical pickup apparatus of claim 1, wherein the first light source and the 2-wavelength light source module are arranged adjacently to each other to project parallel light.

10. The optical pickup apparatus of claim 1, wherein the first light detector and the first light source are arranged so that the optical axis of the light incident to the first light detector is substantially perpendicular to that of the light projected from the first light source.

11. The optical pickup apparatus of claim 1, wherein the high-density recording medium comprises an optical disc belonging to Blue-ray disc (BD) system.

12. The optical pickup apparatus of claim 1, wherein the first light source comprises a laser diode projecting the celadon light.

13. An optical pickup apparatus capable of compatibly employing a high-density recording medium, which uses a celadon light and is slimmer than a digital versatile disc (DVD), and at least one low-density recording medium, the optical pickup apparatus comprising:

an optical unit for projecting a plurality of lights of different wavelengths, the lights including a celadon light, toward a recording medium and receiving the lights reflected from the recording medium to thereby detect an information signal and an error signal; and a compatible objective lens for focusing a light projected from the optical unit to thereby form an optical spot on a recording surface of the recording medium and applicable for at least three lights having different wavelength ranges to be compatibly used for both the high-density and the low-density recording mediums;

wherein the low-density recording medium comprises the DVD and a compact disc (CD); and wherein the optical unit comprises:

a first light source for projecting the celadon light for the high-density recording medium;

a 2-wavelength light source module for projecting an infrared light for the CD and the red light for the DVD and receiving the lights being reflected to thereby detect a signal;

a first light detector for receiving the light projected by the first light source and reflected from the recording medium to thereby detect a signal;

a first optical path converter for changing a path of the light projected by the first light source; and a second optical path converter for changing a path of the light projected by the 2-wavelength light source module;

wherein the first optical path converter comprises:

a polarization beam splitter for reflecting or transmitting an incident light according to polarization component of the incident light; and a wavelength plate for changing the polarization component of the light projected by the first light source and reflected from the recording medium;

wherein the second optical path converter comprises a non-polarization beam splitter between the wavelength plate and the polarization beam splitter.

14. The optical pickup apparatus of claim 13, wherein a reflection member is disposed between the non-polarization beam splitter and the wavelength plate.

15. An optical pickup apparatus capable of compatibly employing a high-density recording medium, which uses a celadon light and is slimmer than a digital versatile disc (DVD), and at least one low-density recording medium, the optical pickup apparatus comprising:
   an optical unit for projecting a plurality of lights of different wavelengths, the lights including a celadon light, toward a recording medium and receiving the lights reflected from the recording medium to thereby detect an information signal and an error signal; and
   a compatible objective lens for focusing a light projected from the optical unit to thereby form an optical spot on a recording surface of the recording medium and applicable for at least three lights having different wavelength ranges to be compatibly used for both the high-density and the low-density recording mediums;
   wherein the low-density recording medium comprises the DVD and a compact disc (CD); and
   wherein the optical unit comprises:
   a first light source for projecting the celadon light for the high-density recording medium;
   a 2-wavelength light source module for projecting an infrared light for the CD and the red light for the DVD and receiving the lights being reflected to thereby detect a signal;
   a first light detector for receiving the light projected by the first light source and reflected from the recording medium to thereby detect a signal;
   a first optical path converter for changing a path of the light projected by the first light source; and
   a second optical path converter for changing a path of the light projected by the 2-wavelength light source module;
   wherein the second optical path converter is disposed on a path of the light projected by the first light source;
   wherein the second optical path converter comprises the non-polarization beam splitter which reflects or transmits the incident light according to the wavelength of the incident light; and
   wherein the non-polarization beam splitter substantially transmits the light having wavelength equal to or greater than 650 nm and reflects the light having wavelength smaller than 650 nm.

16. An optical pickup apparatus capable of compatibly employing a high-density recording medium, which uses a celadon light and is slimmer than a digital versatile disc (DVD), and at least one low-density recording medium, the optical pickup apparatus comprising:
   an optical unit for projecting a plurality of lights of different wavelengths, the lights including a celadon light, toward a recording medium and receiving the lights reflected from the recording medium to thereby detect an information signal and an error signal; and
   a compatible objective lens for focusing a light projected from the optical unit to thereby form an optical spot on a recording surface of the recording medium and applicable for at least three lights having different wavelength ranges to be compatibly used for both the high-density and the low-density recording mediums;
   wherein the optical unit further comprises a spherical aberration compensation unit for compensating for spherical aberrations occurring when using the high-density recording medium using the celadon light; and
   wherein the spherical aberration compensation unit comprises a zoom lens mounted to reciprocate in a direction of the optical axis of the celadon light and a driving unit for operating the zoom lens.

17. An optical pickup apparatus capable of compatibly employing a high-density recording medium, which uses a celadon light and is slimmer than a digital versatile disc (DVD), and at least one low-density recording medium, the optical pickup apparatus comprising:
   an optical unit for projecting a plurality of lights of different wavelengths, the lights including a celadon light, toward a recording medium and receiving the lights reflected from the recording medium to thereby detect an information signal and an error signal; and
   a compatible objective lens for focusing a light projected from the optical unit to thereby form an optical spot on a recording surface of the recording medium and applicable for at least three lights having different wavelength ranges to be compatibly used for both the high-density and the low-density recording mediums;
   wherein the low-density recording medium comprises the DVD and a compact disc (CD); and
   wherein the optical unit comprises:
   a first light source for projecting the celadon light for the high-density recording medium;
   a 2-wavelength light source module for projecting an infrared light for the CD and the red light for the DVD and receiving the lights being reflected to thereby detect a signal;
   a first light detector for receiving the light projected by the first light source and reflected from the recording medium to thereby detect a signal;
   a first optical path converter for changing a path of the light projected by the first light source;
   a second optical path converter for changing a path of the light projected by the 2-wavelength light source module; and
   a first monitoring light detector which receives a part of the light projected by the first light source to monitor output of the first light source;
   wherein the first monitoring light detector directs the first light source.

* * * * *

UNITED STATES PATENT AND TRADEMARK OFFICE
CERTIFICATE OF CORRECTION

PATENT NO.       : 7,613,095 B2                                        Page 1 of 1
APPLICATION NO. : 11/290457
DATED            : November 3, 2009
INVENTOR(S)      : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 932 days.

Signed and Sealed this

Nineteenth Day of October, 2010

David J. Kappos
*Director of the United States Patent and Trademark Office*